Feb. 25, 1958 P. HAAS 2,824,990

SUPPORT ASSEMBLY

Filed June 2, 1955

INVENTOR

PAUL HAAS

BY

Norman J. O'Malley

ATTORNEY

United States Patent Office 2,824,990
Patented Feb. 25, 1958

2,824,990

SUPPORT ASSEMBLY

Paul Haas, Seneca Falls, N. Y., assignor to Sylvania Electric Products Inc., a corporation of Massachusetts Application June 2, 1955, Serial No. 512,647

5 Claims. (Cl. 313—85)

Figure 1:
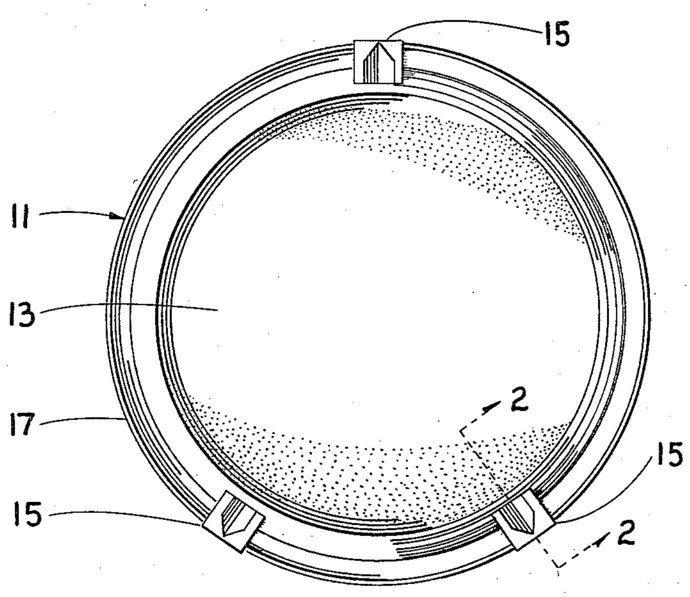

This invention relates to a support assembly and more particularly to an aperture mask support assembly for a color television picture tube.

Masks for color television picture tubes are usually supported by an integral stiffening frame portion formed around the periphery of the mask. Three metal clips are welded to the frame approximately 120° apart to provide axial and angular spacing of the mask from cooperating picture tube elements. In addition, a number of metal protrusions are welded to the frame for supplementary axial support. This construction necessitates making a compromise in mask design, since structural requirements of the shadow mask operative area portion and support portions are in conflict with one another. The operative area of the mask should be made of the thinnest material capable of self support, since the uniformity of the aperture size in a mask made by the conventional photo-etching process varies inversely with the material thickness. Conversely, the peripheral support portion of the mask should be of a material having sufficient thickness to insure adequate support of the mask and maintain the desired geometry of the mask during the various handling and processing operations.

In addition to the foregoing requirements of a satisfactory mask structure, the support portion must have some means for effectively positioning the mask intermediate the phosphor pattern panel and the light source during the screen forming process. Since the mask must be positioned once for each of the three color phosphor pattern forming operations, and again in the finished tube, the locating means must be formed to provide easy and accurate positioning.

It is an object of the invention to provide means for overcoming the aforementioned difficulties, and to provide a structure capable of adequately supporting the mask without requiring a compromise of optimum mask operative area thickness.

A further object is the provision of a support assembly which may be simply attached to the mask and which provides alignment and spacing of the mask with respect to other picture tube elements.

It is a further object of the invention to provide a mask support assembly which accurately spaces and positions the mask with respect to a light source and the phosphor panel during the phosphor pattern forming process.

A still further object is the provision of an improved support bracket for positioning an aperture mask or electrode with respect to the operative elements of color picture tube processing components.

The aforementioned objects are achieved in one aspect of the invention by providing a support for an aperture mask comprising a mask support brace mounted at three positions upon brackets having oppositely disposed substantially V-shaped grooves formed for cooperation with protrusions on the picture tube face or panel at one extremity and with pedestals on the light source housing.

Figure 2:
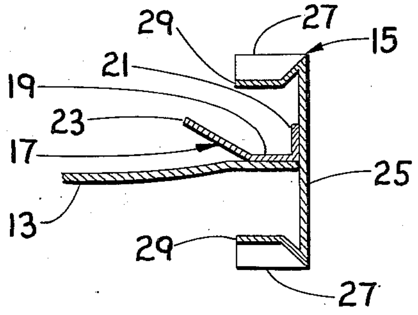
Figure 3:
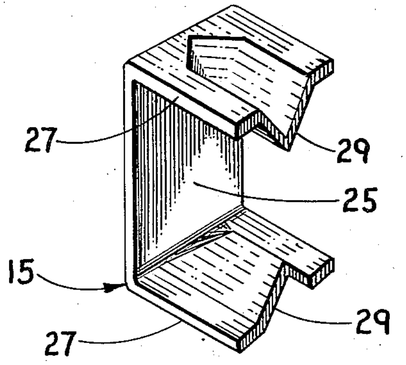
Figure 4:
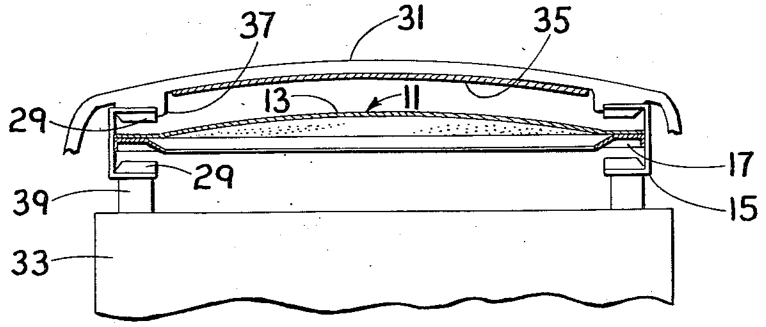

For a better understanding of the invention, together with other and further objects, advantages and capabilities thereof, reference is made to the following description and appended claims in conjunction with the accompanying drawings in which:

Figure 1 is a plan view of an aperture mask assembly constituting one embodiment of the invention; and Figure 2 is a section taken along 2—2 of the drawing shown in Figure 1; and Figure 3 is a perspective view of a bracket employed with the mask assembly; and Figure 4 is a partially sectioned view showing the orientation of parts during a phosphor pattern forming process.

Referring to Figure 1, an aperture mask assembly 11 is shown as having a tube element or aperture mask 13, three mask support brackets 15, and a mask brace 17. The aperture mask, conventional in form, is shown as a spherical shaped metallic member having approximately 200,000 apertures therein. Mask 13 is welded or otherwise affixed along its periphery to brace 17.

Figure 2 illustrates in cross section the position of mask 13 with respect to brace 17. Base section 19 of the brace is welded to the mask, while a vertically extending wall 21 cooperates with the mid-portion of bracket 15 to effectively provide the supporting means for the brace. Brace member 23 extends from base 19 at an obtuse angle and serves as a stiffening element for the brace and mask. Bracket 15 has a central portion 25 and oppositely disposed end portions 27 formed at right angles with the plane of central section 25. These end portions have indented areas or substantially V-shaped grooves 29 formed therein for cooperation with aperture mask assembly positioning protrusions. Two of the three brackets 15 are approximately 70° apart, the third bracket being peripherly equi-distant from the other brackets. This orientation of brackets insures correct positioning of the mask, since it will cooperate with the aligning protrusions in only one manner.

Referring to Figure 3, the grooves 29 in bracket 15 are substantially V-shaped, and extend longitudinally along end portions 27, tapering off symmetrically at a point near the intersecting line of the planes of central section 25 and end portions 27.

Figure 4 shows the position of aperture mask assembly 11, a color picture tube face or panel 31, and a "lighthouse" or source of light 33 during the exposure operation of a tri-color pattern screen forming process. Aperture mask 13, mounted upon brackets 15 and brace 17, is spaced and aligned with respect to light source 33 on one side and picture tube phosphor coating 35 on the other. Protrusions 37 on the tube face and pedestals 39 on the light source housing cooperate with the V-shaped grooves on bracket 15 to affect correct spacing and alignment of the mask during the subsequent placement and removal of the mask assembly for each pattern forming operation. In addition, after the tri-color screen has been completely processed, the aperture mask assembly 11 is permanently spaced in the picture tube by means of V-shaped grooves 29 and cooperating protrusions 37. The mask assembly is conventionally bolted to the picture tube envelope in the finished tube.

An aperture mask support assembly made in accordance with the invention facilitates rapid and accurate positioning of the mask with respect to the components necessary for processing the tri-color phosphor screen, and provides means for spacing and aligning the mask in the finished tube.

While there has been shown and described what at present is considered the preferred embodiment of the invention, it will be obvious to those skilled in the art that various changes and modifications may be made therein without departing from the invention as defined by the appended claims.

What is claimed:

1. An aperture mask positioning assembly for a color picture tube comprising a mask supporting brace with a plurality of brackets mounted thereon, said brackets comprising a central section and oppositely disposed end portions formed to provide substantially V-shaped grooves for operatively positioning the aperture mask.

2. An aperture mask positioning assembly for a color picture tube comprising a mask supporting brace with a plurality of brackets mounted thereon, said brackets comprising a central section and oppositely disposed end portions extending normal to the central section and formed to provide substantially V-shaped grooves for operatively positioning the aperture mask.

3. An aperture mask positioning assembly for a color picture tube comprising a brace with a base member connected to the mask and a plurality of brackets mounted upon said brace, said bracket comprising a central section and oppositely disposed end portions extending normal to the central section and formed to provide substantially V-shaped grooves for operatively positioning the aperture mask.

4. A bracket for positioning an element of a color picture tube intermediate a phosphor panel having positioning means and a phosphor pattern forming device having locating means comprising a central section and oppositely disposed substantially V-shaped grooves formed in the bracket to cooperate with the positioning means and the locating means.

5. An assembly for positioning an aperture mask for a color picture tube intermediate a phosphor panel having protrusions and a phosphor pattern forming device having pedestals comprising a brace and a plurality of brackets mounted upon said brace, the brace including a base member attached to the mask and a rib projecting therefrom, said bracket comprising a central section and opposed end portions formed to provide substantially V-shaped grooves for cooperation with the panel protrusions and pattern forming device pedestals.

References Cited in the file of this patent

UNITED STATES PATENTS

| | | |
|---|---|---|
| Re. 23,735 | Olson | Nov. 10, 1953 |
| 2,727,172 | Mark et al. | Dec. 13, 1955 |